United States Patent
Krompaß et al.

(10) Patent No.: US 10,401,818 B2
(45) Date of Patent: Sep. 3, 2019

(54) METHOD AND APPARATUS FOR AUTOMATIC RECOGNITION OF SIMILARITIES BETWEEN PERTURBATIONS IN A NETWORK

(71) Applicant: Siemens Aktiengesellschaft, München (DE)

(72) Inventors: Denis Krompaß, München (DE); Andreas Litzinger, Fürth (DE); Sebnem Rusitschka, Munich (DE); Volker Tresp, München (DE)

(73) Assignee: SIEMENS AKTIENGESELLSCHAFT (DE)

( * ) Notice: Subject to any disclaimer, the term of this patent is extended or adjusted under 35 U.S.C. 154(b) by 289 days.

(21) Appl. No.: 15/358,307

(22) Filed: Nov. 22, 2016

(65) Prior Publication Data
US 2017/0153615 A1    Jun. 1, 2017

(30) Foreign Application Priority Data
Nov. 30, 2015   (EP) ..................... 15197030

(51) Int. Cl.
*G05D 11/00*   (2006.01)
*G05B 19/048*  (2006.01)
(Continued)

(52) U.S. Cl.
CPC .......... *G05B 19/048* (2013.01); *G06N 20/00* (2019.01); *G06Q 10/06* (2013.01); *G06Q 50/06* (2013.01); *G05B 2219/2639* (2013.01)

(58) Field of Classification Search
CPC .......... G05B 19/048; G05B 2219/2639; G06N 99/005; G06Q 10/06; G06Q 50/06
(Continued)

(56) References Cited

U.S. PATENT DOCUMENTS

| 8,229,722 B2 * | 7/2012 | Nasle ..................... G05B 17/02 703/13 |
| 2004/0090725 A1 | 5/2004 | Rehtanz et al. |

(Continued)

OTHER PUBLICATIONS

Kai Sun et al: "An Online Dynamic Security Assessment Scheme Using Phasor Measurements and Decision Trees"; IEEE Transactions on Power Systems; IEEE Service Center; Piscataway NJ (US); vol. 22 No. 4; pp. 1935-1943; XP011194226; ISSN: 0885-8950; DOI:10.1109/TPWRS.2007.908476.
(Continued)

*Primary Examiner* — Vu A Vu
(74) *Attorney, Agent, or Firm* — Schmeiser, Olsen & Watts LLP

(57) ABSTRACT

A method and apparatus for automatic recognition of similarities between perturbations in a network, the apparatus includes a memory unit for storing a first data array of multiple perturbation data snapshots each recorded in response to a perturbation observed in the network; a generation unit adapted to generate by machine learning a data model of perturbations trained on the first data array, wherein the trained data model provides a latent vector representation for each of the perturbations; a recording unit adapted to record a perturbation data snapshot if a perturbation is observed during operation of said network and adapted to provide a corresponding second data array for the recorded perturbation data snapshot; and a processing unit adapted to derive a latent vector representation for the observed perturbation from the second data array using the trained data model of perturbations.

15 Claims, 2 Drawing Sheets

(51) Int. Cl.
*G06N 20/00* (2019.01)
*G06Q 10/06* (2012.01)
*G06Q 50/06* (2012.01)

(58) Field of Classification Search
USPC ......................................................... 700/286
See application file for complete search history.

(56) References Cited

U.S. PATENT DOCUMENTS

| | | | |
|---|---|---|---|
| 2008/0140326 A1 | 6/2008 | Scholtz et al. | |
| 2012/0150531 A1* | 6/2012 | Bangalore ............... | G06F 17/28 704/9 |
| 2013/0312092 A1* | 11/2013 | Parker ................. | H04L 63/1408 726/22 |
| 2015/0096026 A1* | 4/2015 | Kolacinski .............. | G06F 21/55 726/23 |

OTHER PUBLICATIONS

Extended European Search Report for Application No. 15197030.8, dated May 19, 2016.

* cited by examiner

METHOD AND APPARATUS FOR AUTOMATIC RECOGNITION OF SIMILARITIES BETWEEN PERTURBATIONS IN A NETWORK

CROSS-REFERENCE TO RELATED APPLICATIONS

This application claims priority to European application No. EP15197030.8 having a filing date of Nov. 30, 2015, the entire contents of which are hereby incorporated by reference.

FIELD OF TECHNOLOGY

The following relates to a method and apparatus for automatic recognizing similarities between perturbations in a network and in particular in a power supply network or electric power grid.

BACKGROUND

A power supply system also referred to as electric power grid comprises a plurality of components such as generators, transformers, transmission lines which are vulnerable even to small disturbances or perturbations. These perturbations can cause wide area oscillations which may destabilize the power supply system and which can even lead to cascading outages within the power supply system. Distributed energy resources and renewable energy resources, in particular renewable energy sources, require the power supply networks to adapt to faster changing and sometimes unexpected system conditions. However, a conventional power supply system management relies on offline studies and simulations with data models based on steady-state assumptions. Real-time online data from the power supply network may be used to trigger alarms in case that predetermined system thresholds are reached. An operator of the power supply system has to interpret the received data based on his experience and possibly based on information exchanged with neighbouring grid operators. Root-cause identification of a perturbation within the power supply system requires a time-consuming analysis of multiple time-series data.

SUMMARY

An aspect relates to providing a method and apparatus for automatic recognizing similarities between perturbations in a network that allows an operator a fast and reliable root-cause identification of an observed perturbation within the network.

Embodiments of the invention provide according to a first aspect a method for automatic recognizing similarities between perturbations in a network, the method comprising: providing a first data array of multiple perturbation data snapshots each recorded and or simulated in response to a perturbation observed in said network, generating by machine learning a data model of perturbations trained on the first data array, wherein the trained data model provides a latent vector representation for each of the perturbations, recording and or simulating a perturbation data snapshot if a perturbation is observed during operation of said network and providing a corresponding second data array for the recorded and or simulated perturbation data snapshot, deriving a latent vector representation for the observed perturbation from the second data array using the trained data model of perturbations and detecting perturbations similar to the observed perturbation on the basis of the derived latent vector representation of the observed perturbation and on the basis of the latent vector representations of multiple perturbations provided by the trained data model.

In a possible embodiment of the method according to the first aspect of the present invention, the network is a power supply network comprising a plurality of phase measurement units which measure energy flow parameters.

In a possible embodiment of the method according to the first aspect of the present invention, the measured energy flow parameters comprise phase currents and phase voltages of different phases of the power supply network and a local network frequency.

In a still further possible embodiment of the method according to the first aspect of the present invention, the first data array is a four-dimensional data array, wherein each entry $x_i$, j, t, k indicates a measurement X of type j of a phase measurement unit $PMU_i$ at a time t for a perturbation k observed in said network.

In a still further possible embodiment of the method according to the first aspect of the present invention, the perturbations similar to the observed perturbation are detected on the basis of calculated cosine distances between the derived latent vector representation of the observed perturbation and the latent vector representations of the multiple perturbations provided by the trained data model.

In a possible embodiment of the method according to the first aspect of the present invention, the data model of perturbations is generated by unsupervised machine learning.

In a further possible embodiment of the method according to the first aspect of the present invention, depending on the recognized similarities between perturbations in the network a root cause for at least one observed perturbation is determined.

In a further possible embodiment of the method according to the first aspect of the present invention, depending on the recognized similarities between perturbations in the network a perturbation type of the at least one observed perturbation is determined.

Embodiments of the invention further provide according to a second aspect an apparatus for automatic recognition of similarities between perturbations in a network comprising the features of the claims.

Embodiments of the invention provide according to a second aspect an apparatus for automatic recognition of similarities between perturbations in a network, said apparatus comprising: a memory unit for storing a first data array of multiple perturbation data snapshots each recorded and or simulated in response to a perturbation observed in said network, a generation unit adapted to generate by machine learning a data model of perturbations trained on the first data array, wherein the trained data model provides a latent vector representation for each of the perturbations, a recording unit adapted to record and or simulate a perturbation data snapshot if a perturbation is observed during operation of said network and adapted to provide a corresponding second data array for the recorded and or simulated perturbation data snapshot and a processing unit adapted to derive a latent vector representation for the observed perturbation from the second data array using the trained data model of perturbations and adapted to detect perturbations similar to the observed perturbation on the basis of the derived latent vector representation of the observed perturbation and on the basis of the latent vector representations of multiple perturbations provided by the trained data model.

In a possible embodiment of the apparatus according to the second aspect of the present invention, the processing unit is adapted to detect perturbations similar to the observed perturbation on the basis of calculated cosine distances between the derived latent vector representation of the observed perturbation and the latent vector representations of multiple perturbations provided by the trained data model.

In a further possible embodiment of the apparatus according to the second aspect of the present invention, the processing unit is adapted to determine a root cause for the at least one observed perturbation depending on the recognized similarities between perturbations in the network.

In a still further possible embodiment of the apparatus according to the second aspect of the present invention, the processing unit is adapted to determine a perturbation type of at least one observed perturbation depending on the recognized similarities between perturbations in the network.

In a possible embodiment of the apparatus according to the second aspect of the present invention, the memory unit is adapted to store as the first data array a four-dimensional data array, wherein each entry $x_i$, j, t, k indicates a measurement X of a measurement type j of a phase measurement unit $PMU_i$ at a time t for a perturbation k observed in said network.

In a further possible embodiment of the apparatus according to the second aspect of the present invention, the network is a power supply network, comprising a plurality of phase measurement units each adapted to measure energy flow parameters comprising phase currents and phase voltages of different phases of the power supply network and a local network frequency of said network.

Embodiments of the invention provide according to the third aspect a network comprising phase measurement units each being adapted to measure energy flow parameters comprising phase currents and phase voltages of different phases of the network and a local network frequency, wherein said network further comprises an apparatus for automatic recognition of similarities between perturbations in the network, the apparatus comprising a memory unit for storing a first data array of multiple perturbation data snapshots each recorded and or simulated in response to a perturbation observed in said network, a generation unit adapted to generate by machine learning a data model of perturbations trained on the first data array, wherein the trained data model provides a latent vector representation for each of the perturbations, a recording unit adapted to record a perturbation data snapshot if a perturbation is observed during operation of said network and adapted to provide a corresponding second data array for the recorded perturbation data snapshot and a processing unit adapted to derive a latent vector representation for the observed perturbation from the second data array using the trained data model of perturbations and adapted to detect perturbations similar to the observed perturbation on the basis of the derived latent vector representation of the observed perturbation and on the basis of the latent vector representations of multiple perturbations provided by the trained data model.

BRIEF DESCRIPTION

Some of the embodiments will be described in detail, with reference to the following figures, wherein like designations denote like membes, wherein.

DETAILED DESCRIPTION

Figure 1:
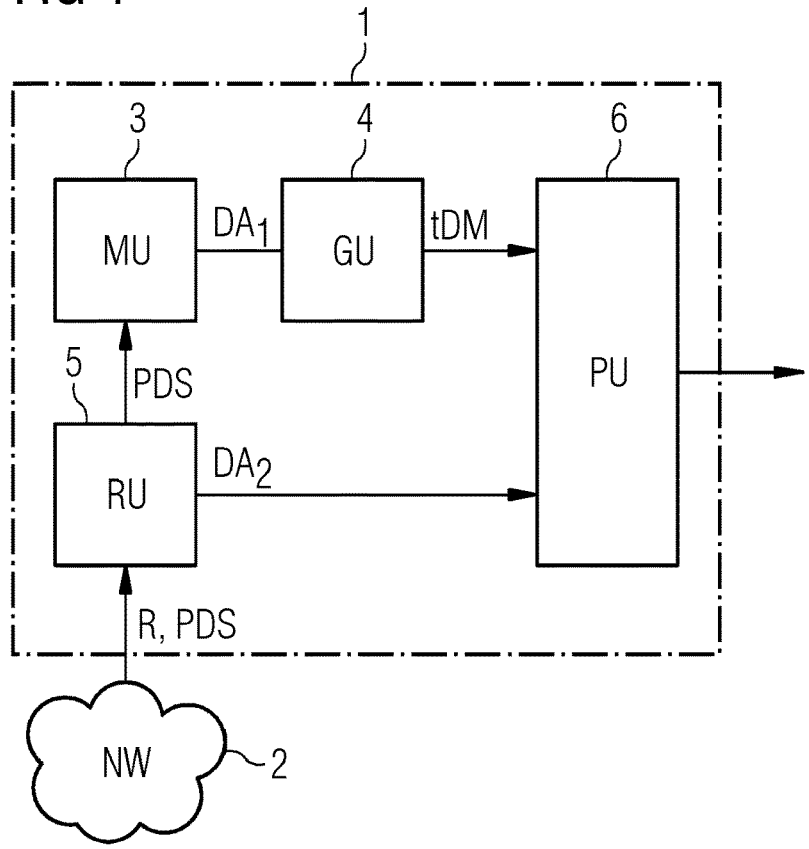
FIG. 1 shows a block diagram of a possible exemplary embodiment of an apparatus for automatic recognition of similarities between perturbations in a network.
Figure 3:
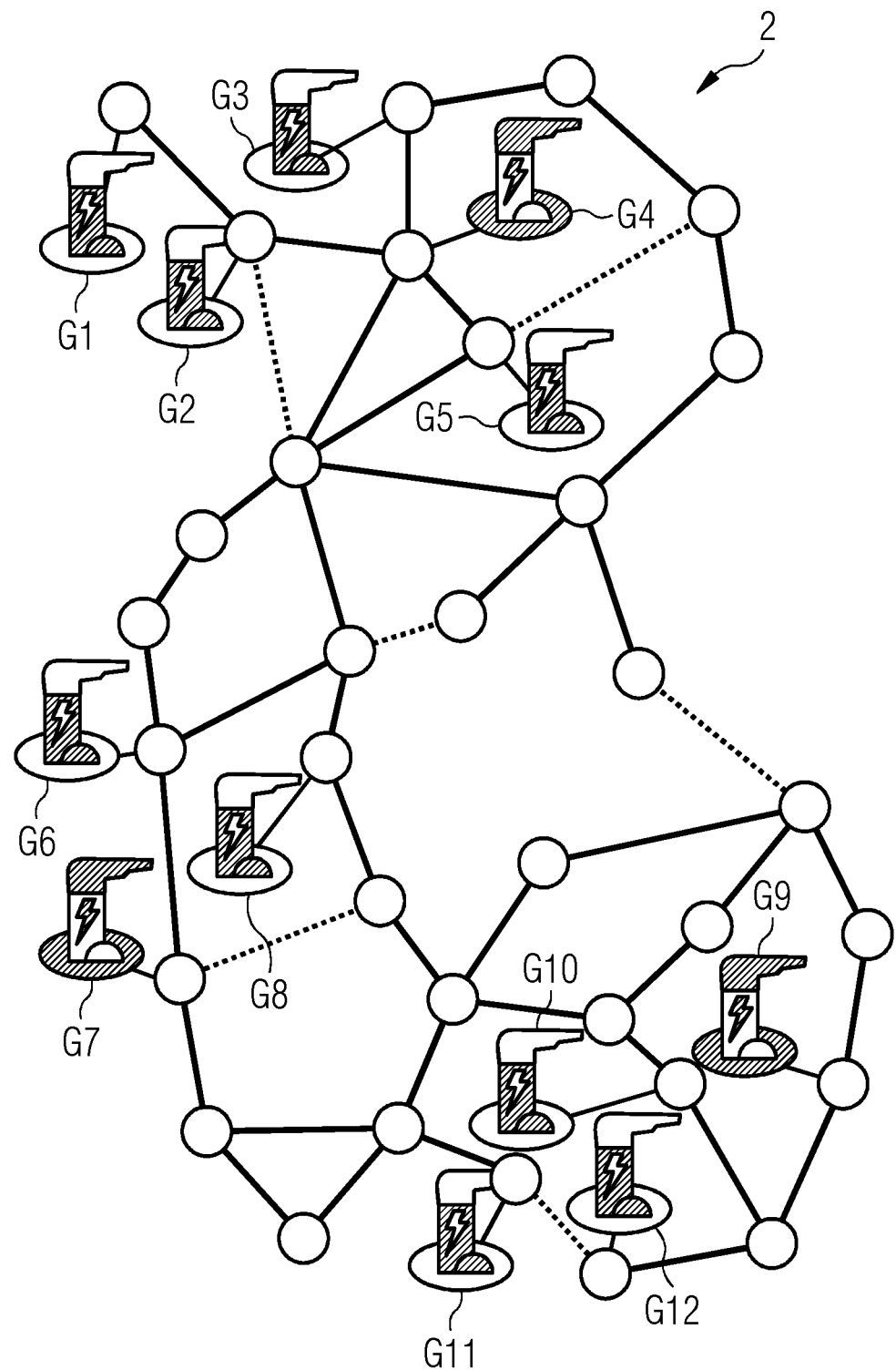
FIG. 3 shows a schematic diagram of a possible exemplary embodiment of a network.

As can be seen in FIG. 1, an apparatus 1 for automatic recognition of similarities between perturbations in a network may be linked to the respective network 2. The network 2 is in a possible embodiment a power supply network such as illustrated in FIG. 3 comprising a plurality of phase measurement units PMU which measure energy flow parameters. In the embodiment as shown in FIG. 1, the apparatus 1 comprises a memory unit 3 storing a first data array DA1 of multiple perturbation data snapshots each recorded in response to a perturbation or disturbance observed in the network 2. In a possible embodiment the data snapshot can also be simulated. In a possible embodiment, the memory unit 3 stores as the first data array a four-dimensional data array, wherein each entry $x_i$, j, t, k indicates a measurement X of a measurement type j of a phase measurement unit $PMU_i$ at a time t for a perturbation k observed within the network 2.

The apparatus 1 further comprises a generation unit 4 which is adapted to generate by machine learning a data model of perturbations trained on the first data array DA1 read from the memory unit 3. The trained data model generated by the generation unit 4 provides a latent vector representation for each of the perturbations. In a preferred embodiment, the data model of perturbations is generated by unsupervised machine learning.

The apparatus 1 further comprises a recording unit 5 adapted to record a perturbation data snapshot PDS if a perturbation is observed during operation of the network 2 and is adapted to provide a corresponding second data array DA2 for the recorded perturbation data snapshots. In a possible embodiment, the streamed data of detected perturbations is represented by a fourth-order tensor or data array DA2 with the same shape or form as the tensor or first array DA1 within the first three modes of $PMU_i$, measurement type j and time t but with the last mode of size 1 since the tensor or second data array DA2 holds the data of a single perturbation k. A perturbation k within the network 2 can be for instance a generator trip or a line trip which has an impact on the stability of the network 2. The phase measurement units PMU of the power supply network 2 can measure energy flow parameters. These energy flow parameters can comprise in a possible embodiment three-phase currents I1, I2, I3 and three-phase voltages U1, U2, U3 as well as a local frequency f of a three-phase power supply system comprising three phases L1, L2, L3. The phase measurement units PMU can be located at specific sites within the network 2 to monitor the state of the whole power supply network 2. The phase measurement units PMU provide measurements X with a high resolution, wherein the measurements can be time-synchronized, for instance via GPS. In a possible embodiment, a phase measurement unit can send its measured values at a reporting rate of up to 120 samples per second. To compare measurements of different locations phase measurement units PMUs are synchronized with an accuracy of less than 5 seconds on a GPS clock. With the method and apparatus according to the present invention, it is possible to correlate the incoming data streams retrieved by the phase measurement units PMUs with a set of scenario stored in a database.

As illustrated in FIG. 1, the apparatus 1 comprises a processing unit 6 adapted to derive a latent vector representation for the observed perturbation k from the second data array DA2 provided by said recording unit using the trained data model of perturbations provided by the generation unit 4. The processing unit 6 of the apparatus 1 is further adapted to detect perturbations similar to the observed perturbation on the basis of the derived latent vector representation of the observed perturbation k and on the basis of the latent vector representations of multiple perturbations provided by the trained data model. The processing unit 6 is adapted to detect perturbations similar to the observed perturbation k in a possible embodiment on the basis of calculated cosine distances between the derived latent vector representation of the observed perturbation k and the latent vector representations of the multiple perturbations provided by the trained data model tDM output by the generation unit 4.

In a further possible embodiment of the apparatus 1 according to the present invention, the processing unit 6 is further adapted to determine a root cause for the at least one observed perturbation depending on the recognized similarities between the perturbations in the respective network 2. The processing unit 6 is further adapted in a possible embodiment to determine a perturbation type of at least one observed perturbation depending on the recognized similarities between perturbations in the network 2.

In a possible embodiment, with the method and apparatus according to the present invention, a database can be mined in an offline phase to extract perturbation data snapshots PDS. A perturbation data snapshot PDS comprises sensor data provided by sensors within the network 2 which occur in a predetermined time period after a perturbation or disturbance has been observed in the respective network 2. In a possible embodiment, the sensors comprise phase measurement units PMUs each providing sensor data of measured energy flow parameters including phase currents I1, I2, I3 and phase voltages U1, U2, U3 as well as a local network frequency f at the respective site of the phase measurement unit PMU. In an exemplary embodiment, a sensor such as the phase measurement unit PMU within the power supply network 2 provides seven time-series sensor data to the apparatus 1. If the power supply network 2 comprises N phase measurement units PMUs the perturbation data snapshot taken of the network 2 comprises 7×N time-series data. A perturbation data snapshot PDS is a snapshot of the whole network 2 comprising time-series sensor data for different network parameters within a predetermined time after such a disturbance or perturbation has been observed. In a possible embodiment, a data snapshot can comprise sensor data or time-series data within a time period of several seconds starting from the beginning of the past disturbance within the network 2. The collection of these data snapshots for a multiple set of disturbances or perturbations can be labelled beforehand by domain experts and can be organized in the fourth-order tensor forming the first data array DA1. The labels can indicate where the perturbation has happened and what kind of disturbance it is, for instance "generator trip in Turkey". Using this fourth-order tensor or data array, in a possible embodiment, a machine learning technique can be performed known as tensor factorization (PARAFAC) which can be exploited as a pre-trained data model in an online phase. A result of this data model is a latent representation for the perturbations that describe the characteristics of each perturbation in a numerical vector form.

In an online phase, a perturbation data snapshot PDS comprising the incoming data from the multiple phase measurements units PMUs is extracted and recorded if a perturbation is detected. This single data snapshot of the perturbation observed during operation of the network 2 can also be organized in a tensor, i.e. the second data array DA2 for the recorded perturbation data snapshot. Given this tensor, a latent representation for the perturbation is derived exploiting the pre-trained data model generated by the generation unit 4 in the offline phase. Using the latent representation for the perturbation and the multiple latent representations of multiple perturbations provided by the data model trained on the first data array DA1, the processing unit 6 can detect similar disturbances or perturbations in the offline database or memory unit 3 through the basis of calculated cosine distances between the derived latent vector representation of the perturbation k observed in the online phase and the latent vector representations of multiple perturbations provided by the trained data model tDM. From the detected similar perturbations, the processing unit 6 can estimate a probable root cause and location of the observed perturbation within the network 2. After having extracted the data snapshot, the detection of similar perturbations can be accomplished within seconds automatically even for a very large power supply network comprising thousands of phase measurement units PMUs. With the method and apparatus according to the present invention, it is possible to exploit the natural multidimensionality of the data in a tensor which allows to consider multidimensional correlations and dependencies between the measurements over time received from multiple phase measurement units PMUs within the power supply network 2. With the method and apparatus, a prior tensor factorization is used as a data model to project observed data in the same latent data space to provide a similarity detection. The method is performed in a preferred embodiment completely unsupervised. The time-consuming processing in the offline phase can be done at any point in time independent from the respective system. In the online phase, detecting similarities can be performed within a few seconds leading to near real-time responses. Further, the detection of similar perturbations within the network 2 can illuminate the root cause and or location of the encountered perturbation. With the method and apparatus according to the present, the experience and knowledge about past disturbances or perturbations can be directly transferred to current observed disturbances or perturbations within the monitored network 2.

Figure 2:
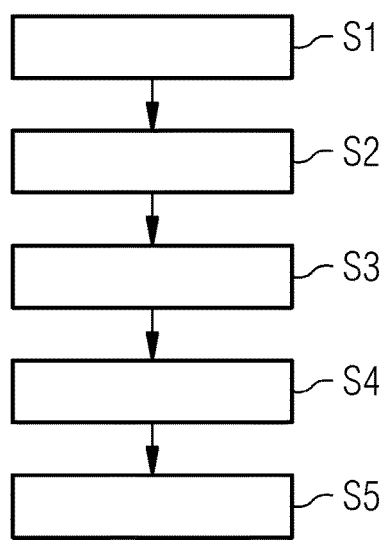
FIG. 2 shows a flowchart of a possible exemplary embodiment of a method for automatic recognizing similarities between perturbations in a network.

FIG. 2 shows flowchart of a possible exemplary embodiment of a method for automatic recognizing similarities between perturbations in a network according to an aspect of the present invention.

In a first step S1, a first data array DA1 of multiple perturbation data snapshots PDS is provided, wherein each data snapshot is recorded in response to a perturbation k observed within the network 2. The network 2 can be a power supply network comprising a plurality of phase measurement units PMUs which measure energy flow parameters.

In a further step S2, a data model of perturbations is generated by machine learning and trained on the first data array DA1, wherein the trained data model tDM provides a latent vector representation for each of the multiple perturbations.

In a further step S3, a perturbation data snapshot PDS is recorded if a perturbation k is observed during operation of the network 2 and a corresponding second data array DA2 is provided for the recorded perturbation data snapshot PDS.

In a further step S4, a latent vector representation for the observed perturbation is derived from the second data array DA2 using the trained data model tDM of perturbations.

Finally, in step S5, perturbations similar to the observed perturbation k are detected on the basis of the derived latent vector representation of the observed perturbation and on the basis of the latent vector representations of multiple perturbations provided by the trained data model tDM. In a possible embodiment, perturbations similar to the observed perturbations are detected on the basis of calculated cosine distances between the derived latent vector representation of the observed perturbation k and the latent vector representations of the multiple perturbations provided by the trained data model tDM. Further, in a possible embodiment, depending on the recognized similarities between perturbations in the network 2, a root cause for at least one observed perturbation can be automatically determined. Moreover, in a further possible embodiment, depending on the recognized similarities between perturbations in the network 2, a perturbation type of the at least one observed perturbation can be automatically determined in step S5.

FIG. 3 shows an exemplary embodiment of a network 2 according to a further aspect of the present invention. The network 2 is a power supply network 2 comprising a plurality of phase measurements units PMUs each adapted to measure energy flow parameters comprising phase currents I1, I2, I3 and phase voltages U1, U2, U3 of different phases L1, L2, L3 of the three-phase power supply network and a local network frequency fat the respective site of the phase measurement unit PMU. The network 2 comprises at least one network controller or apparatus for automatic recognition of similarities between perturbations in the power supply network 2 as illustrated in FIG. 1. As shown in FIG. 3, a power supply network 2 comprises in the illustrated embodiment power supply generators represented by power plant symbols. They can be power supply generators with observed trips and with not observed trips. In the power supply network 2 shown in FIG. 3, the power supply network comprises 12 power supply generators G1 to G12, wherein three generators G4, G7 and G9 provide generator trips performing perturbations within the power supply network 2. In the network illustrated in FIG. 2 nodes represent substations where PMU measured data for perturbations are available. In order to recognize location and time of a newly encountered perturbation regional data is used to recognize similarities in the observed perturbations. In the exemplary power supply network 2 shown in FIG. 4, there are three different clusters of power plants or power supply generators. With the method and apparatus according to the present invention, it is possible to assign future perturbations or generator trips to the different clusters. The same can be applied to line trips of power supply transmission lines where the most similar line trip or perturbation can provide hints where a newly observed line trip most likely occurred within the power supply network 2. With the method and apparatus according to the present invention, it is possible to provide an offline database of perturbations that cover the various types of perturbations in regions of interest within and outside of a monitored subnetwork, for instance for line and generator trips. With this offline database, it is possible to assign a newly observed perturbation to the most similar perturbation stored in the offline database. With the method and apparatus according to the present invention, it is possible to recognize similarities between perturbations and streamed high resolution transmission network data by using tensor factorization.

The invention claimed is:

1. A method for automatically recognizing similarities between perturbations in a network, wherein the network is at least one of a power supply network and an electric power grid, said method comprising:
    providing a first data array of multiple perturbation data snapshots each recorded and or simulated in response to a perturbation observed in said network;
    generating by machine learning a data model of perturbations trained on the first data array, wherein the trained data model provides a latent vector representation for each of the perturbations;
    recording and or simulating a perturbation data snapshot of the multiple perturbation data snapshots if the perturbation is observed during operation of said network and providing a corresponding second data array for the recorded and or simulated perturbation data snapshot;
    deriving a latent vector representation for the observed perturbation from the second data array using the trained data model of perturbations; and
    detecting perturbations similar to the observed perturbation on the basis of the derived latent vector representation of the observed perturbation and on the basis of the latent vector representations of the multiple perturbations provided by the trained data model.

2. The method according to claim 1, wherein said network is a power supply network comprising a plurality of phase measurement units, PMU, which measure energy flow parameters.

3. The method according to claim 2, wherein the measured energy flow parameters comprise phase currents and phase voltages of different phases of the power supply network and a local network frequency.

4. The method according to claim 2, wherein the first data array is a four-dimensional data array, wherein each entry $x_i$, j, t, k indicates a measurement X of type j by a phase measurement unit, $PMU_i$, at a time t for a perturbation k observed in said network.

5. The method according to claim 1, wherein perturbations similar to the observed perturbation are detected on the basis of calculated cosine distances between the derived latent vector representation of the observed perturbation and the latent vector representations of the multiple perturbations provided by the trained data model.

6. The method according to claim 1, wherein the data model of perturbations is generated by unsupervised machine learning.

7. The method according to claim 1, wherein depending on the recognized similarities between perturbations in the network a root cause for at least one observed perturbation is determined.

8. The method according to claim 1, wherein depending on the recognized similarities between perturbations in the network a perturbation type of the at least one observed perturbation is determined.

9. An apparatus for automatic recognition of similarities between perturbations in a network, said apparatus comprising:
    a memory unit for storing a first data array of multiple perturbation data snapshots each recorded and or simulated in response to a perturbation observed in said network;
    a generation unit adapted to generate by machine learning a data model of perturbations trained on the first data array, wherein the trained data model provides a latent vector representation for each of the perturbations;

a recording unit adapted to record and or simulate a perturbation data snapshot if a perturbation of the multiple perturbation data snapshots is observed during operation of said network and adapted to provide a corresponding second data array for the recorded and or simulated perturbation data snapshot; and a processing unit adapted to derive a latent vector representation for the observed perturbation from the second data array using the trained data model of perturbations, adapted to detect perturbations similar to the observed perturbation on the basis of the derived latent vector representation of the observed perturbation and on the basis of the latent vector representations of the multiple perturbations provided by the trained data model, and adapted to determine a root cause for the at least one observed perturbation depending on the recognized similarities between perturbations in the network.

10. The apparatus according to claim 9, wherein the processing unit is adapted to detect perturbations similar to the observed perturbation on the basis of calculated cosine distances between the derived latent vector representation of the observed perturbation and the latent vector representations of the multiple perturbations provided by the trained data model.

11. The apparatus according to claim 9, wherein said processing unit is adapted to determine a perturbation type of at least one observed perturbation depending on the recognized similarities between perturbations in the network.

12. The apparatus according to claim 9, wherein said memory unit stores as the first data array a four-dimensional data array, wherein each entry $x_i$, j, t, k indicates a measurement X of a measurement type j of a phase measurement unit, $PMU_i$, at a time t for a perturbation k observed in said network.

13. The apparatus according to claim 9, wherein said network is a power supply network, comprising a plurality of phase measurement units which are adapted to measure energy flow parameters comprising phase currents and phase voltages of different phases of the power supply network and a local network frequency of said network.

14. The apparatus of claim 9, wherein the apparatus is connected to the network,
further wherein, the network comprises: phase measurement units, PMU, adapted to measure energy flow parameters comprising phase currents and phase voltages of different phases of the network and a local network frequency.

15. A method for automatically recognizing similarities between stored perturbation data snapshots of perturbations observed in a power network in an offline phase and perturbation data snapshots observed during operation of the power network in an online phase, comprising:

providing in the offline phase a first data array of the multiple perturbation data snapshots each recorded and or simulated in response to a perturbation observed in the power network and comprising sensor data provided by sensors within the power network;

generating in the offline phase by machine learning a data model of perturbations trained on the first data array, wherein the trained data model provides a latent vector representation for each of the perturbations;

recording and or simulating in the online phase a perturbation data snapshot of the multiple perturbation data snapshots if the perturbation is observed during operation of the power network and providing a corresponding second data array for the recorded and or simulated perturbation data snapshot;

deriving a latent vector representation for the observed perturbation from the second data array using the trained data model of perturbations; and detecting perturbations similar to the observed perturbation on the basis of the derived latent vector representation of the observed perturbation and on the basis of the latent vector representations of the multiple perturbations provided by the trained data model.

\* \* \* \* \*